(12) United States Patent
Azuma et al.

(10) Patent No.: US 12,145,586 B2
(45) Date of Patent: Nov. 19, 2024

(54) DRIVING ASSIST APPARATUS FOR VEHICLE

(71) Applicant: SUBARU CORPORATION, Tokyo (JP)

(72) Inventors: Ryuya Azuma, Tokyo (JP); Hikaru Yoshikawa, Tokyo (JP); Masahito Sekine, Tokyo (JP); Yuta Sato, Tokyo (JP); Keisuke Motegi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 216 days.

(21) Appl. No.: 17/895,714

(22) Filed: Aug. 25, 2022

(65) Prior Publication Data

US 2023/0086053 A1 Mar. 23, 2023

(30) Foreign Application Priority Data

Sep. 22, 2021 (JP) ................................. 2021-154820

(51) Int. Cl.
| | |
|---|---|
| *B60W 30/16* | (2020.01) |
| *B60W 10/18* | (2012.01) |
| *B60W 50/029* | (2012.01) |
| *G06V 20/58* | (2022.01) |

(52) U.S. Cl.
CPC ............ *B60W 30/16* (2013.01); *B60W 10/18* (2013.01); *B60W 50/029* (2013.01); *G06V 20/58* (2022.01); *B60W 2050/0292* (2013.01); *B60W 2420/403* (2013.01); *B60W 2554/80* (2020.02); *B60W 2710/182* (2013.01)

(58) Field of Classification Search
CPC .............................. G06V 20/58; B60W 30/16
See application file for complete search history.

(56) References Cited

U.S. PATENT DOCUMENTS

| 10,752,246 B2* | 8/2020 | Lin ..................... B60W 30/143 |
|---|---|---|
| 2014/0149013 A1 | 5/2014 | Matsuno |
| 2019/0217829 A1* | 7/2019 | Kim .......................... B60T 7/22 |
| 2019/0293758 A1* | 9/2019 | Masui ...................... G08G 1/16 |
| 2020/0156633 A1* | 5/2020 | Stephan .............. B60W 30/165 |
| 2020/0298853 A1* | 9/2020 | Bast ....................... G08G 1/166 |
| 2020/0369274 A1* | 11/2020 | Mizuno ................ G01S 13/867 |

(Continued)

FOREIGN PATENT DOCUMENTS

| JP | 2014-106805 A | 6/2014 |
|---|---|---|
| JP | 2016-200929 A | 12/2016 |

*Primary Examiner* — Long T Tran
(74) *Attorney, Agent, or Firm* — Rimon P.C.

(57) ABSTRACT

A driving assist apparatus for a vehicle includes a front-side-environment recognition camera, a front-side-environment recognition sensor, and a control device. The front-side-environment recognition camera is configured to recognize a driving environment ahead of the vehicle. The front-side-environment recognition sensor is configured to recognize the driving environment ahead of the vehicle. In a case where image recognition of the front-side-environment recognition camera for a leading vehicle for adaptive cruise control has deteriorated during execution of the adaptive cruise control, the control device is configured to continue executing the adaptive cruise control based on a distance from the vehicle to the leading vehicle obtained by the front-side-environment recognition sensor.

10 Claims, 4 Drawing Sheets

(56) References Cited

U.S. PATENT DOCUMENTS

| | | | |
|---|---|---|---|
| 2020/0391764 A1* | 12/2020 | Gotou | B60W 30/162 |
| 2021/0056322 A1* | 2/2021 | Hasegawa | G01S 13/08 |
| 2021/0064041 A1* | 3/2021 | Kim | B60W 30/18159 |
| 2021/0171030 A1* | 6/2021 | Lee | H04W 4/40 |
| 2021/0269062 A1* | 9/2021 | Yasutomi | G06T 7/50 |
| 2021/0284153 A1* | 9/2021 | Baek | B60W 30/18163 |

\* cited by examiner

DRIVING ASSIST APPARATUS FOR VEHICLE

CROSS-REFERENCE TO RELATED APPLICATIONS

The present application claims priority from Japanese Patent Application No. 2021-154820 filed on Sep. 22, 2021, the entire contents of which are hereby incorporated by reference.

BACKGROUND

The disclosure relates to a driving assist apparatus for a vehicle, which includes an adaptive cruise control (ACC) function.

To lessen the burden of a driver and also to improve driving safety, driving assist apparatuses for assisting driving operations for a driver have been put to practical use.

In such driving assist apparatuses, the following driving modes, for example, are set. In a manual driving mode, a driver manually drives a vehicle by performing steering and accelerating/decelerating. In a driving assist mode, steering assist control and acceleration/deceleration control are performed while driving operations of a driver are being reflected. In another driving assist mode (autonomous driving mode), a vehicle is autonomously driven without the intervention of a driver.

Examples of the functions to implement driving assist control in each driving assist mode are an adaptive cruise control (ACC) function and an active lane keep centering (ALKC) function. As a result of performing driving assist control, a vehicle can be driven autonomously along a driving lane while maintaining a distance with a leading vehicle.

Japanese Unexamined Patent Application Publication (JP-A) No. 2016-200929 discloses the following driving assist technology. When an obstacle approaching from the outside of the angle of view of a camera is detected by a radar, the brakes are applied to gain time before the object enters the angle of view of the camera. JP-A No. 2014-106805 discloses a driving assist technology for detecting an object outside the driver's visible range with a radar and applying the brakes.

SUMMARY

An aspect of the disclosure provides a driving assist apparatus for a vehicle. The driving assist apparatus includes a front-side-environment recognition camera, a front-side-environment recognition sensor, and a control device. The front-side-environment recognition camera is configured to recognize a driving environment ahead of the vehicle. The front-side-environment recognition sensor is configured to recognize the driving environment ahead of the vehicle. In a case where image recognition of the front-side-environment recognition camera for a leading vehicle for adaptive cruise control has deteriorated during execution of the adaptive cruise control, the control device is configured to continue executing the adaptive cruise control based on a distance from the vehicle to the leading vehicle obtained by the front-side-environment recognition sensor.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Figure 1:
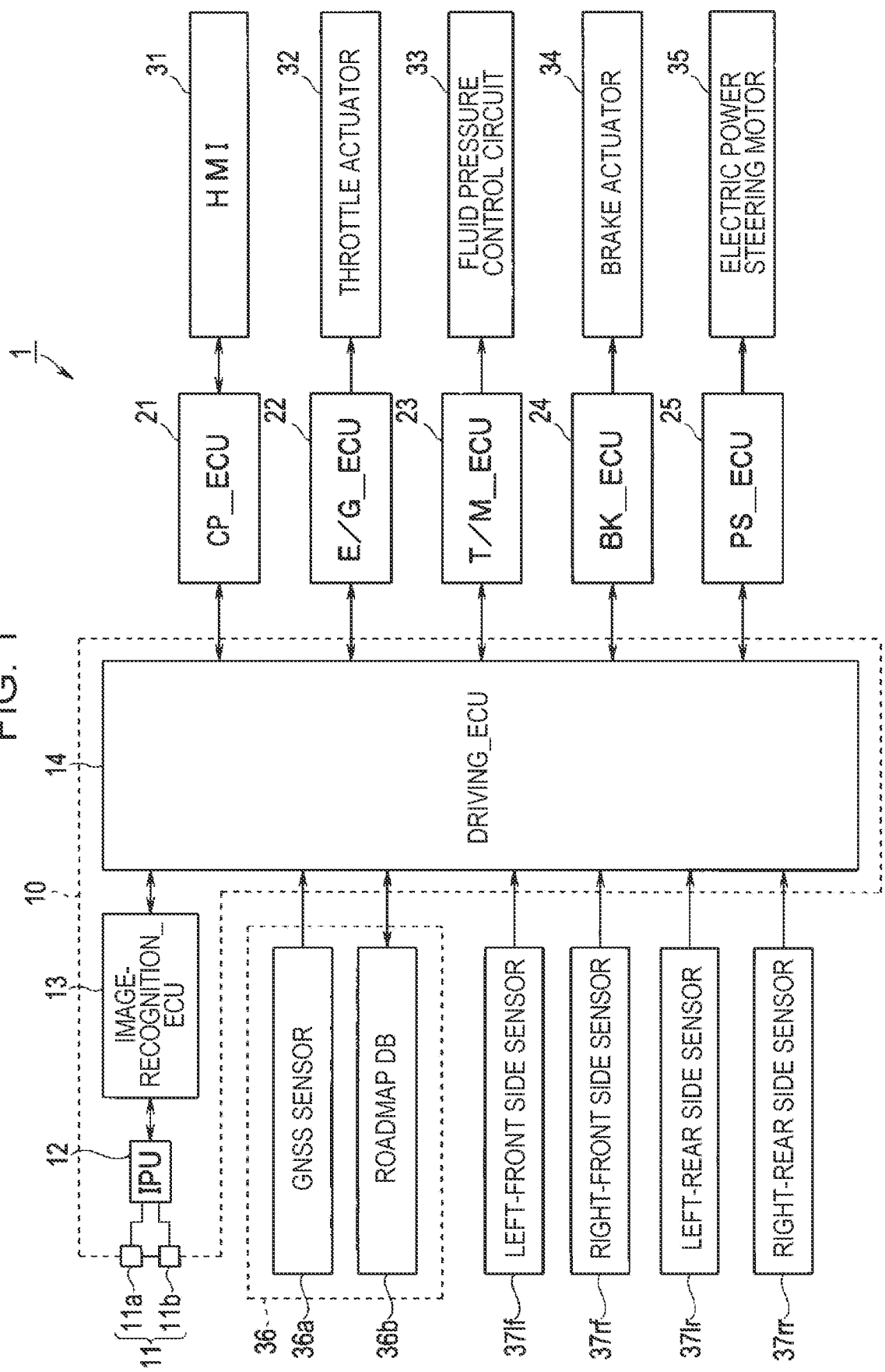
FIG. 1 is a schematic block diagram illustrating a driving assist apparatus according to an embodiment of the disclosure.

In known driving assist control, while ACC control is being performed, if the recognition performance of a camera is lowered under a poor environment, such as low visibility due to fog, rain, or backlight, it is not possible to recognize a leading vehicle, thereby failing to continue performing ACC control. That is, if a camera has become unable to detect a leading vehicle during the execution of ACC control, ACC control is terminated and is switched to driver's driving.

It is desirable to provide a driving assist apparatus for a vehicle, which can continuously perform ACC control even under a poor environment, such as low visibility.

An embodiment of the disclosure will be described below in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In the disclosure, the number of pieces of each element, the shape and the dimensional ratio of each element, and relative positional relationship between elements are not limited to those illustrated in the drawings.

The disclosure will be described below through illustration of an embodiment. FIG. 1 is a schematic block diagram illustrating a driving assist apparatus 1 according to an embodiment of the disclosure.

As illustrated in FIG. 1, the driving assist apparatus 1 includes a camera unit 10, which is fixed at the center of the top front section in a compartment of a vehicle. Hereinafter, the vehicle including the driving assist apparatus 1 will be called the vehicle M.

The camera unit 10 includes a stereo camera 11, an image processing unit (IPU) 12, an image recognition unit (image-recognition_ECU) 13, and a driving control unit (driving_ECU) 14. In one embodiment, the driving_ECU 14 may serve as a "control device".

Figure 2:
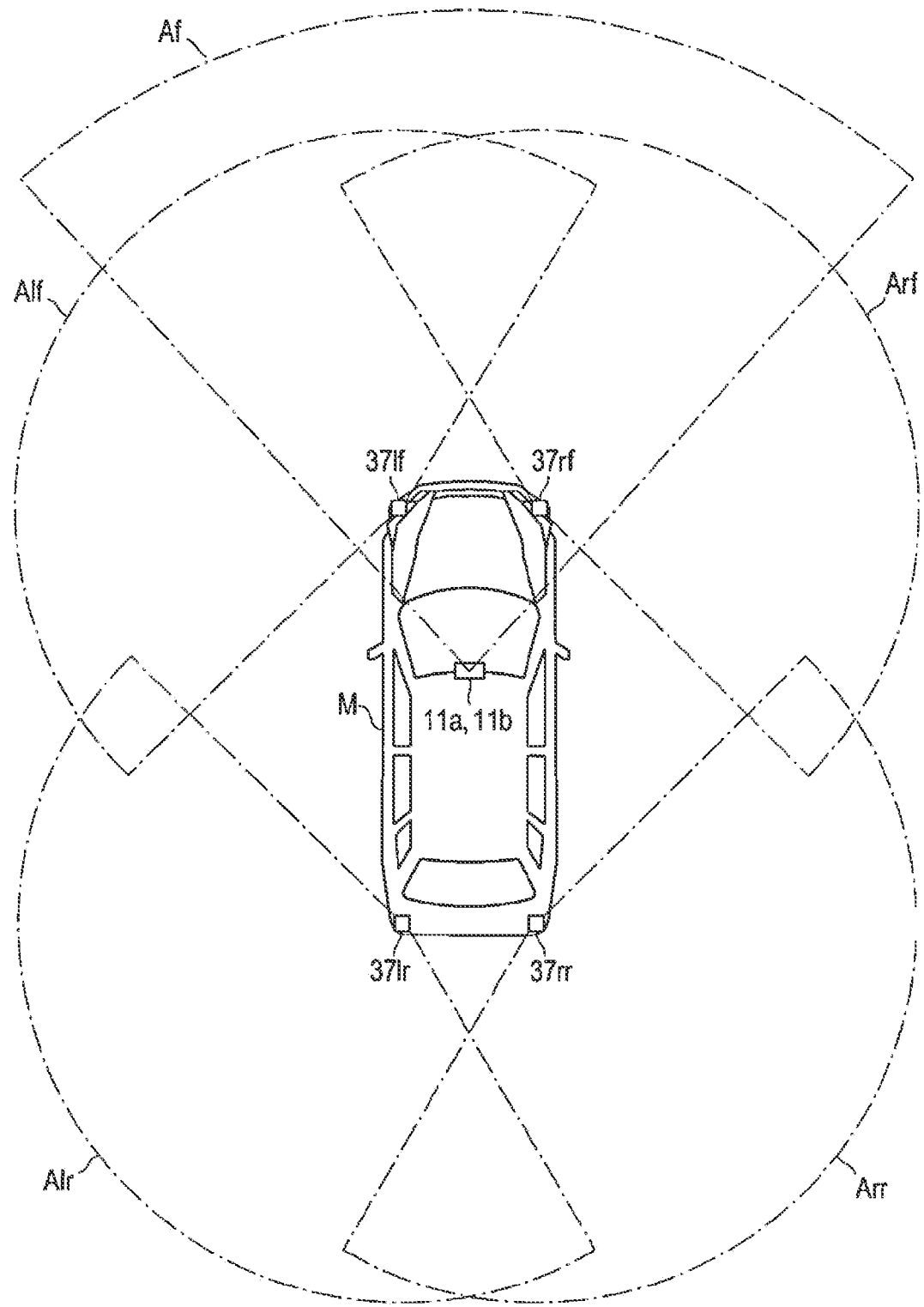
FIG. 2 is a conceptual view for describing monitor areas of a stereo camera, a radar, and a sonar.

In one embodiment, the stereo camera 11 may serve as a "front-side-environment recognition camera". The stereo camera 11 includes a main camera 11*a* and a sub-camera 11*b*. For example, the main camera 11*a* and the sub-camera 11*b* are disposed at horizontally symmetrical positions along the width of the vehicle M. The main camera 11*a* and the sub-camera 11*b* are constituted by complementary metal-oxide-semiconductor (CMOS) image sensors, for example. The main camera 11*a* and the sub-camera 11*b* perform stereo imaging from different viewpoints in preset imaging cycles synchronized with each other to image the driving environment in a front area Af (see FIG. 2) outside the vehicle M.

The IPU 12 performs predetermined image processing on driving environment images obtained by the stereo camera 11 to detect edges of various targets, such as solid objects (hereinafter simply called objects) and marking lines on the road surface included in the images. The IPU 12 then obtains distance information based on the positional disparity of the edges between the left and right images and generates image information including this distance information (hereinafter called distance image information).

Based on the distance image information and other information received from the IPU 12, the image-recognition_ECU 13 determines the road curvature [1/m] of marking lines that define the left and right sides of a driving lane where the vehicle M is driving and also determines the width (lane width) between the left and right marking lines.

Various methods are known to determine the road curvature and the lane width. For example, based on driving environment information, the image-recognition_ECU 13 recognizes left and right marking lines by executing binarizing processing using the differences of the luminance levels, and finds the curvature of each of the left and right marking lines in every predetermined zone by using a curve approximation expression based on the least square method. The image-recognition_ECU 13 then calculates the lane width from the difference in the curvature between the left and right marking lines.

The image-recognition_ECU 13 then calculates the center of the driving lane and a deviation of the lateral position of the vehicle M, for example, based on the lane width and the curvature of each of the left and right marking lines. A deviation of the lateral position of the vehicle M is the distance from the center of the driving lane to the center of the vehicle M in the widthwise direction.

The image-recognition_ECU 13 also performs predetermined pattern matching on the distance image information so as to recognize objects, such as guardrails and curbs along the road, and other objects, such as surrounding vehicles.

In one example, for each object, the image-recognition_ECU 13 recognizes the type of object, height of the object, distance to the object, velocity of the object, and relative velocity Vrel of the object to the vehicle M.

The above-described various items of information obtained by the image-recognition_ECU 13 are output to the driving_ECU 14 as driving environment information.

In the embodiment, together with the stereo camera 11 and the IPU 12, the image-recognition_ECU 13 implements a function as a driving environment recognizer that obtains driving environment information on the environment around the vehicle M.

The driving_ECU 14 is a control unit that centrally controls the driving assist apparatus 1.

Various control units, such as a cockpit control unit (CP_ECU) 21, an engine control unit (E/G_ECU) 22, a transmission control unit (T/M_ECU) 23, a braking control unit (BK_ECU) 24, and a power steering control unit (PS_ECU) 25, are coupled to the driving_ECU 14 via an in-vehicle communication network, such as a controller area network (CAN).

Various sensors, such as a locator unit 36, a left-front side sensor 37*lf*, a right-front side sensor 37*rf*, a left-rear side sensor 37*lr*, and a right-rear side sensor 37*rr* are also coupled to the driving_ECU 14. In one embodiment, the left-front side sensor 37*lf* and the right-front side sensor 37*rf* may serve as a "front-side-environment recognition sensor".

A human machine interface (HMI) 31 provided near a driver's seat is coupled to the CP_ECU 21. The HMI 31 includes a switch for providing an instruction to execute various driving assist control operations, a mode changing switch for changing the driving mode, a steering touch sensor that detects the steering state of a driver, a driver monitoring system (DMS) that performs face recognition of a driver and detects the eye direction of a driver, a touchscreen display, a combination meter, and a speaker.

In response to a control signal from the driving_ECU 14, the CP_ECU 21 suitably supplies various items of information to the driver. For example, the CP_ECU 21 supplies information on various alarms to be output to other vehicles, such as a leading vehicle, the execution situation of driving assist control, and the driving environment of the vehicle M to the driver. Such information is displayed or output as sound using the HMI 31. The CP_ECU 21 also outputs various items of input information, such as ON/OFF operation states input by the driver using the HMI 31 in response to various driving assist control operations, to the driving_ECU 14.

A throttle actuator 32 for an electronic control throttle, for example, is coupled to the output side of the E/G_ECU 22. Various sensors (not illustrated), such as an accelerator sensor, are coupled to the input side of the E/G_ECU 22.

The E/G_ECU 22 controls the driving of the throttle actuator 32 based on a control signal from the driving_ECU 14 or detection signals from various sensors. The E/G_ECU 22 adjusts the air intake amount of an engine and causes the throttle actuator 32 to generate a desired level of engine output. The E/G_ECU 22 also outputs detection signals, such as an accelerator position signal, output from various sensors to the driving_ECU 14.

A fluid pressure control circuit 33 is coupled to the output side of the T/M_ECU 23. Various sensors (not illustrated), such as a transmission position sensor, are coupled to the input side of the T/M_ECU 23. The T/M_ECU 23 performs fluid pressure control for the fluid pressure control circuit 33, based on an engine torque signal indicating an engine torque estimated by the E/G_ECU 22 and detection signals from various sensors. The T/M_ECU 23 operates certain elements, such as a friction element and a pulley, provided in an automatic transmission to transmit the engine output at a desired transmission gear ratio.

The T/M_ECU 23 also outputs detection signals, such as a transmission position signal, output from various sensors to the driving_ECU 14.

A brake actuator 34 is coupled to the output side of the BK_ECU 24. The brake actuator 34 adjusts the brake fluid pressure to be applied to a brake wheel cylinder provided in each wheel. Various sensors (not illustrated), such as a brake pedal sensor, a yaw rate sensor, a longitudinal acceleration sensor, and a vehicle velocity sensor, are coupled to the input side of the BK_ECU 24.

The BK_ECU 24 controls the driving of the brake actuator 34, based on a control signal from the driving_ECU 14 or detection signals from various sensors. The BK_ECU 24 causes the brake actuator 34 to suitably generate a braking force in each wheel to perform forced braking control or yaw rate control for the vehicle M.

The BK_ECU 24 outputs detection signals, such as signals indicating the braking state, yaw rate, longitudinal acceleration, and velocity of the vehicle M, output from various sensors to the driving_ECU 14.

An electric power steering motor 35 is coupled to the output side of the PS_ECU 25. The electric power steering motor 35 applies a steering torque to a steering mechanism by using a rotational force of the motor. Various sensors, such as a steering torque sensor and a steering angle sensor, are coupled to the input side of the PS_ECU 25.

The PS_ECU 25 controls the driving of the electric power steering motor 35, based on a control signal from the driving_ECU 14 or detection signals from various sensors. The PS_ECU 25 causes the electric power steering motor 35 to generate a steering torque to be applied to the steering mechanism.

The PS_ECU 25 also outputs signals, such as a steering torque signal and a steering angle signal, output from various sensors to the driving_ECU 14.

The locator unit 36 includes a global navigation satellite system (GNSS) sensor 36a and a high-definition roadmap database (roadmap DB) 36b.

The GNSS sensor 36a receives positioning signals emitted from multiple positioning satellites so as to measure the position (such as the latitude, longitude, and altitude) of the vehicle M.

The roadmap DB 36b is a large-capacity storage medium, such as a hard disk drive (HDD), and stores high-definition roadmap information (dynamic map). The roadmap DB 36b stores lane data regarding each lane used for autonomous driving. Examples of the lane data are the lane width, coordinates of the position of the lane center, azimuth angle in the traveling direction, and speed limit.

The lane data is stored on a roadmap at intervals of several meters of each lane. The roadmap DB 36b also stores information, such as parking lots and various other facilities. In response to a request signal from the driving_ECU 14, for example, as driving environment information, the roadmap DB 36b outputs roadmap information within a set range based on the position of the vehicle M measured by the GNSS sensor 36a to the driving_ECU 14.

In the embodiment, together with the GNSS sensor 36a, the roadmap DB 36b implements a function as the driving environment recognizer that obtains driving environment information on the environment around the vehicle M.

The left-front side sensor 37lf and the right-front side sensor 37rf are constituted by millimeter radars or light detection and ranging (LiDAR) sensors, for example. The left-front side sensor 37lf and the right-front side sensor 37rf are respectively installed on the left and right sides of a front bumper of the vehicle M, for example.

The left-front side sensor 37lf and the right-front side sensor 37rf detect objects in the front area Af ahead of the vehicle M and also respectively detect, as driving environment information, objects in an area Alf (see FIG. 2) from the obliquely left-front side to the left side and those in an area Arf (see FIG. 2) from the obliquely right-front side to the right side, which are difficult to recognize by images captured by the stereo camera 11.

Instead of or in addition to the left-front side sensor 37lf and the right-front side sensor 37rf, a LiDAR sensor that can detect a wide area including the front side, obliquely left/right-front sides, and left and right sides may be provided.

The left-rear side sensor 37lr and the right-rear side sensor 37rr are constituted by LiDAR sensors or millimeter radars. The left-rear side sensor 37lr and the right-rear side sensor 37rr are respectively installed on the left and right sides of a rear bumper of the vehicle M, for example. The left-rear side sensor 37lr and the right-rear side sensor 37rr respectively detect, as driving environment information, objects in an area Alr (see FIG. 2) from the obliquely left-rear side to the rear side and those in an area Arr (see FIG. 2) from the obliquely right-rear side to the rear side, which are difficult to recognize by the left-front side sensor 37lf and the right-front side sensor 37rf.

Each millimeter radar analyzes reflected light or reflected waves returned from objects so as to mainly detect solid objects, such as vehicles driving along the vehicle M in the same direction. In one example, each millimeter radar detects, as information concerning a solid object, the lateral width, the positions of representative points (relative position of the object to the vehicle M), and velocity.

In the embodiment, the left-front side sensor 37lf, right-front side sensor 37rf, left-rear side sensor 37lr, and right-rear side sensor 37rr implement a function as an environment recognition sensor that obtains driving environment information on the environment around the vehicle M. The left-front side sensor 37lf and the right-front side sensor 37rf also form the front-side-environment recognition sensor.

The driving_ECU 14 converts the coordinates of each of the objects outside the vehicle M indicated by the driving environment information obtained by the image-recognition_ECU 13, the driving environment information obtained by the locator unit 36, and the individual items of driving environment information obtained by the left-front side sensor 37lf, right-front side sensor 37rf, left-rear side sensor 37lr, and right-rear side sensor 37rr, into coordinates of a three-dimensional coordinate system having the center of the vehicle M as the origin.

In the driving_ECU 14, a manual driving mode, first and second driving control modes, and a safe mode, are set as the driving modes. The driving_ECU 14 can selectively switch between these modes, based on the operation state of the mode changing switch disposed in the HMI 31, for example.

The manual driving mode is a mode performed by driver's steering. For example, in the manual driving mode, the driver manually drives the vehicle M by performing steering, accelerating, and braking.

The first driving control mode is also a mode performed by driver's steering. The first driving control mode is a semi-autonomous driving mode which allows the vehicle M to run along a target driving route. For example, in the first driving control mode, while driving operations of the driver are being reflected, ACC control, ALKC control, and active lane keep bouncing (ALKB) control are suitably combined and performed under the control of the E/G_ECU 22, BK_ECU 24, and PS_ECU 25.

ACC control is performed basically based on the driving environment information input from the image-recognition_ECU 13, that is, based on leading vehicle information, for example, included in the driving environment information.

ALKC control and ALKB control are performed basically based on at least one of the driving environment information input from the image-recognition_ECU 13 or the driving environment information input from the locator unit 36. For example, ALKC control and ALKB control are performed based on lane marking line information included in the driving environment information obtained by the image-recognition_ECU 13 or the locator unit 36.

The second driving control mode is an autonomous driving mode which allows the vehicle M to run without the intervention of driver's steering, accelerating, and braking operations. For example, in the second driving control mode, ACC control, ALKC control, and ALKB control are suitably combined and performed under the control of the E/G_ECU 22, BK_ECU 24, and PS_ECU 25, so that the vehicle M is autonomously driven to run along a target driving route (route map information).

The safe mode is a mode which automatically brings the vehicle M to a stop in a pedestrian zone, for example, when the vehicle M has become unable to continue driving in the second driving control mode and failed to switch to driver's driving (that is, to the manual driving mode or the first driving control mode).

An example of control processing to be executed while the driving assist apparatus 1 of the embodiment is performing ACC control will be discussed below. The same control processing is executed while the driving assist apparatus 1 is performing ACC control in the autonomous driving mode, namely, the second driving control mode.

Figure 3:
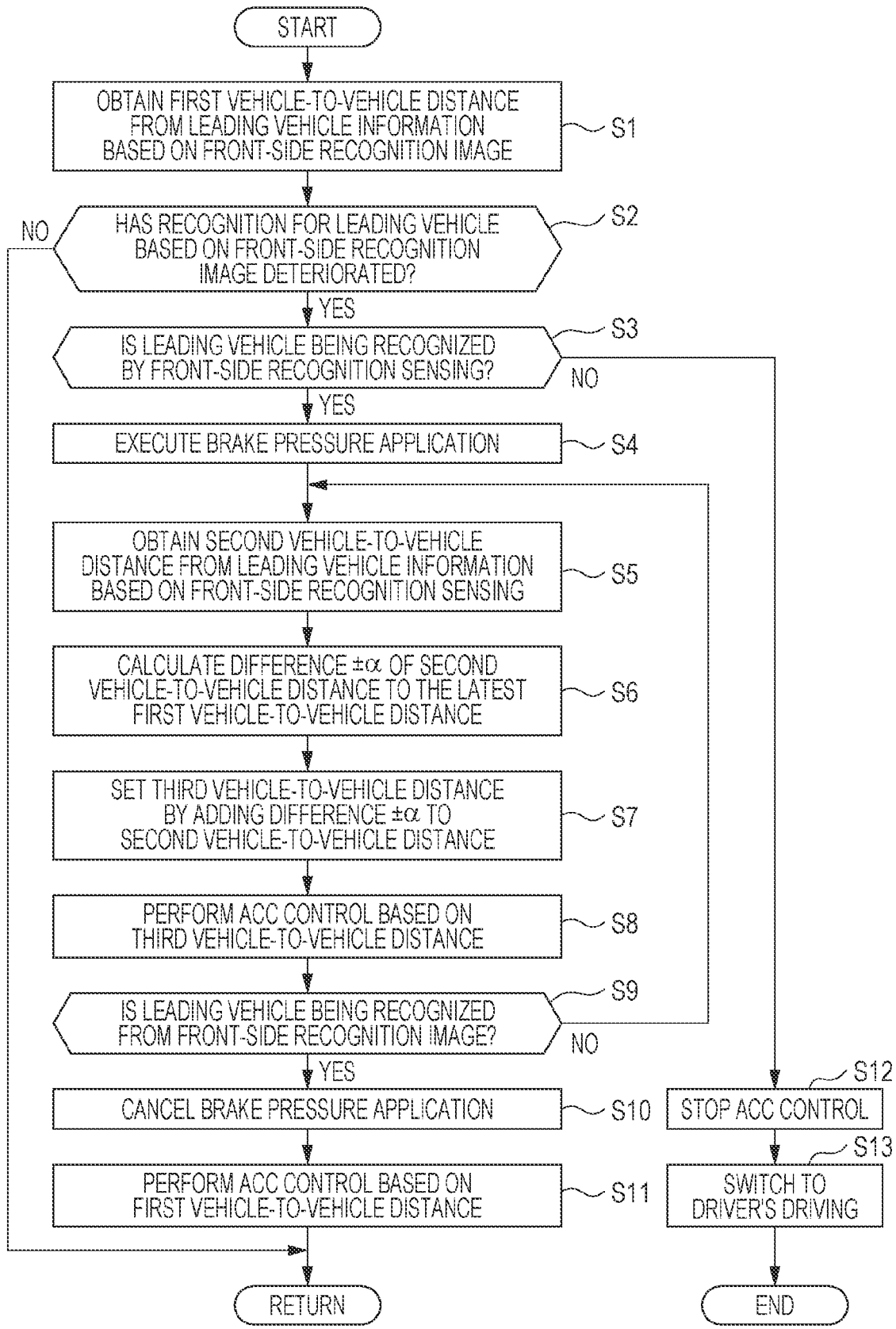
FIG. 3 is a flowchart illustrating an example of control processing to be executed during the execution of ACC control.

While the driving assist apparatus 1 is performing ACC control, the driving_ECU 14 executes the control processing illustrated in the flowchart of FIG. 3.

Figure 4A:
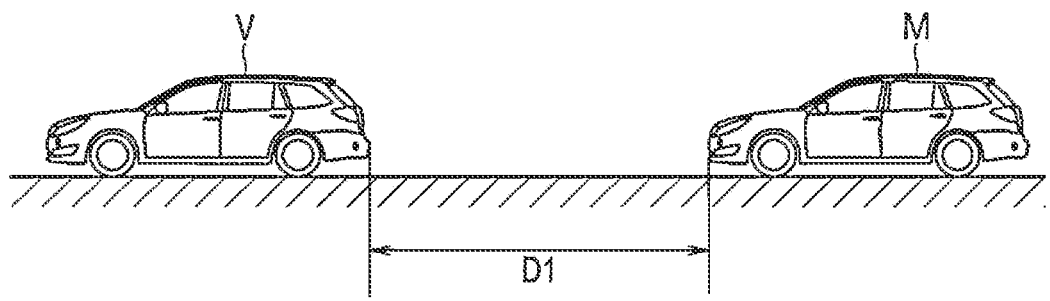
FIG. 4A illustrates a first vehicle-to-vehicle distance between a vehicle M and a leading vehicle.

In step S1, the driving_ECU 14 obtains a first vehicle-to-vehicle distance D1, which is the distance from the vehicle M to a leading vehicle V (see FIG. 4A), from leading vehicle information based on a front-side recognition image. For example, the driving_ECU 14 obtains the first vehicle-to-vehicle distance D1 indicated by the leading vehicle information included in the driving environment information based on the front-side recognition image input from the image-recognition_ECU 13. The front-side recognition image is an object recognition image subjected to image processing by the IPU 12 based on the driving environment images captured by the stereo camera 11.

The first vehicle-to-vehicle distance D1 corresponds to a vehicle-to-vehicle distance which is set during the execution of ACC control. The vehicle-to-vehicle distance of the vehicle M is set based on its velocity.

In step S2, the driving_ECU 14 determines whether the recognition performance of the stereo camera 11 for the leading vehicle V is lowered. The driving_ECU 14 determines that the recognition performance of the stereo camera 11 is lowered if, for example, a model frame (also called a bounding box or a window) including the recognized leading vehicle V subjected to image processing by the IPU 12 based on the driving environment images captured by the stereo camera 11 is not output or if, for example, a model frame including the recognized leading vehicle V is unstably output.

The driving_ECU 14 may fail to recognize the leading vehicle V or the recognition performance may become unstable because of poor visibility due to fog, heavy rain, or backlight.

If it is found in step S2 that a model frame (a bounding box or a window) including the recognized leading vehicle V is stably output, the driving_ECU 14 returns to step S1.

If the recognition performance of the stereo camera 11 for the leading vehicle V is found to be lowered, the driving_ECU 14 proceeds to step S3 to determine whether the leading vehicle V is being recognized by front-side recognition sensing.

In this manner, if the recognition performance of the stereo camera 11 for the leading vehicle V based on the front-side recognition image is lowered, the driving_ECU 14 determines whether the leading vehicle V is being recognized by front-side recognition sensing of the left-front side sensor 37*lf* and the right-front side sensor 37*rf*, which serve as the front-side-environment recognition sensor.

If it is found in step S3 that the leading vehicle V is being recognized by front-side recognition sensing of the left-front side sensor 37*lf* and the right-front side sensor 37*rf*, the driving_ECU 14 executes brake pressure application in step S4.

The driving_ECU 14 raises the brake fluid pressure to be adjusted by the brake actuator 34 to a certain level so as to enhance the responsiveness of the brake actuator 34 controlled by the BK_ECU 24. That is, the driving_ECU 14 raises the brake fluid pressure to such a degree as not to generate a braking force in the vehicle M. This can avoid a delay in the braking timing and enhances the responsiveness to emergency braking.

Figure 4B:
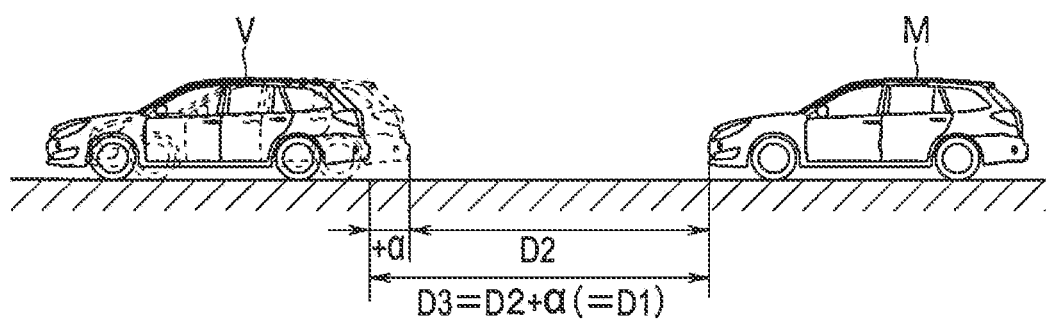
FIG. 4B illustrates a third vehicle-to-vehicle distance obtained by adding a difference a to a second vehicle-to-vehicle distance.
Figure 4C:
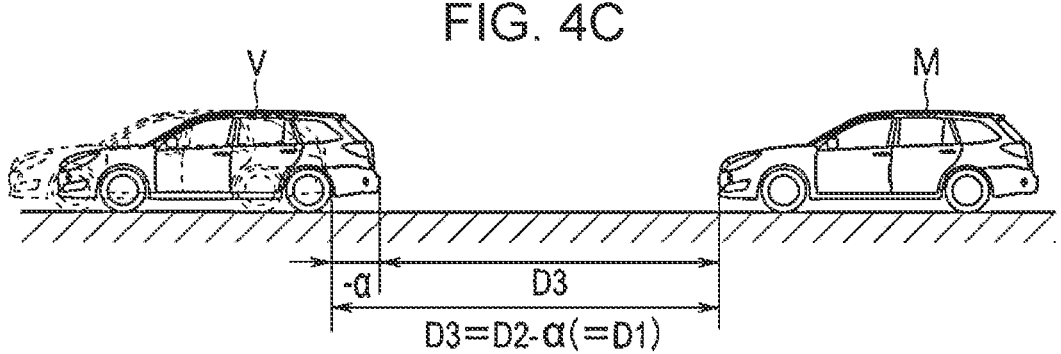
FIG. 4C illustrates a third vehicle-to-vehicle distance obtained by subtracting a difference a from a second vehicle-to-vehicle distance.

Then, in step S5, the driving_ECU 14 obtains a second vehicle-to-vehicle distance D2 (see FIGS. 4B and 4C), which is the distance from the vehicle M to the leading vehicle V, from leading vehicle information obtained by the left-front side sensor 37*lf* and the right-front side sensor 37*rf*. The driving_ECU 14 obtains the second vehicle-to-vehicle distance D2 indicated by the leading vehicle information input from the left-front side sensor 37*lf* and the right-front side sensor 37*rf*.

Then, in step S6, the driving_ECU 14 calculates a difference $\pm\alpha$, which is an error of the second vehicle-to-vehicle distance D2 with respect to the latest first vehicle-to-vehicle distance D1. The accuracy of the second vehicle-to-vehicle distance D2 is lower than that of the first vehicle-to-vehicle distance D1 indicated by the leading vehicle information based on the front-side recognition image. That is, an error occurs in the second vehicle-to-vehicle distance D2, which is a relative distance between the vehicle M and the leading vehicle V. The driving_ECU 14 thus calculates a difference $\pm\alpha$, which is an error of the second vehicle-to-vehicle distance D2 with respect to the latest first vehicle-to-vehicle distance D1.

In step S7, the driving_ECU 14 sets a third vehicle-to-vehicle distance D3 (see FIGS. 4B and 4C) by adding or subtracting the difference $\alpha$ to or from the second vehicle-to-vehicle distance D2. In step S8, the driving_ECU 14 performs ACC control based on the third vehicle-to-vehicle distance D3. That is, the third vehicle-to-vehicle distance D3 is a correction value (D3=D2$\pm\alpha$) obtained by adding or subtracting the difference $\alpha$ to or from the vehicle-to-vehicle distance D2 so that the second vehicle-to-vehicle distance D2 approximates the first vehicle-to-vehicle distance D1 based on the front-side recognition image.

Then, in step S9, the driving_ECU 14 determines whether the leading vehicle V is being recognized from the front-side recognition image. The driving_ECU 14 makes this determination in accordance with whether a model frame (a bounding box or a window) including the recognized leading vehicle V is stably output.

If it is found that the leading vehicle V is not being recognized from the front-side recognition image, the driving_ECU 14 returns to step S5 and repeats steps S5 through S9.

If it is found that the leading vehicle V is being recognized from the front-side recognition image, the driving_ECU 14 cancels brake pressure application in step S10. The driving_ECU 14 returns the brake fluid pressure raised under the control of the BK_ECU 24 to a regular level.

In step S11, the driving_ECU 14 performs ACC control by using the first vehicle-to-vehicle distance D1. That is, since the leading vehicle V is being recognized from the front-side recognition image, the driving_ECU 14 switches the third vehicle-to-vehicle distance D3 to the first vehicle-to-vehicle distance D1 and then performs ACC control. The driving_ECU 14 then returns to step S1.

If it is found in step S3 that the leading vehicle V is not recognized even by front-side recognition sensing, the driving_ECU 14 stops ACC control in step S12 and switches to driver's driving in step S13. The driving_ECU 14 then terminates the control processing.

As described above, the driving assist apparatus 1 of the embodiment performs ACC control, basically based on driving environment information obtained from an image input from the image-recognition_ECU 13. Even if the recognition performance of the stereo camera 11 is temporarily lowered due to a poor environment, such as low visibility, the driving assist apparatus 1 can maintain a distance with the leading vehicle V based on driving environment information obtained by sensing of millimeter radars or LiDAR sensors constituted by the left-front side sensor 37*lf* and the right-front side sensor 37*rf*. As a result, the driving assist apparatus 1 can continue performing ACC control.

When performing ACC control based on driving environment information obtained by sensing of millimeter radars or LiDAR sensors, the driving assist apparatus 1 applies a predetermined pressure by raising the brake fluid pressure from a regular level, thereby enhancing the responsiveness to emergency braking.

The image-recognition_ECU 13, driving_ECU 14, CP_ECU 21, E/G_ECU 22, T/M_ECU 23, BK_ECU 24, and PS_ECU 25 are each constituted by a processor including a central processing unit (CPU) and storages, such as a random access memory (RAM) and a read only memory (ROM). All or some of the circuits forming the processor may be executed by software. The CPU may read various programs corresponding to individual functions from the ROM and execute them.

All or some of the functions of the processor may be constituted by a logical circuit or an analog circuit. The various programs may be implemented by an electronic circuit, such as a field programmable gate array (FPGA).

The disclosure is not limited to the above-described embodiment and various modifications may be made without departing from the spirit and scope of the disclosure. For example, some of the elements disclosed in the embodiment may be omitted suitably, and some of the elements in different embodiments may be combined suitably.

According to an embodiment of the disclosure, it is possible to provide a driving assist apparatus for a vehicle, which can continuously perform ACC control for a leading vehicle even under a poor environment, such as low visibility.

The driving assist apparatus 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving assist apparatus 1 including the image-recognition_ECU 13, driving_ECU 14, CP_ECU 21, E/G_ECU 22, T/M_ECU 23, BK_ECU 24, and PS_ECU 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving assist apparatus for a vehicle, the driving assist apparatus comprising:
    a front-side-environment recognition camera configured to recognize a driving environment ahead of the vehicle;
    a front-side-environment recognition sensor configured to recognize the driving environment ahead of the vehicle; and
    a control device configured to:
        determine that image recognition of the front-side-environment recognition camera for a leading vehicle for adaptive cruise control has deteriorated during execution of the adaptive cruise control;
        in response to determining that the image recognition of the front-side-environment recognition camera for the leading vehicle has deteriorated, calculate a difference between a first distance and a second distance, the first distance being a distance from the vehicle to the leading vehicle obtained by the image recognition of the front-side-environment recognition camera before determining that the image recognition of the front-side-environment recognition camera for the leading vehicle has deteriorated, the second distance being the distance from the vehicle to the leading vehicle obtained by the front-side-environment recognition sensor after determining that the image recognition of the front-side-environment recognition camera for the leading vehicle has deteriorated;
        calculate a third distance by adding or subtracting the difference to the second distance; and
        using the third distance as a current distance from the vehicle to the leading vehicle, continue to execute the adaptive cruise control based on a distance from the vehicle to the leading vehicle to be obtained by the front-side-environment recognition sensor.

2. The driving assist apparatus according to claim 1, wherein the control device is configured to execute brake pressure application by raising a brake fluid pressure to be applied to a braking device in a case where the image recognition of the front-side-environment recognition camera for the leading vehicle has deteriorated.

3. The driving assist apparatus according to claim 2, wherein the control device is configured to cancel the brake pressure application in a case where the leading vehicle is recognized by the image recognition of the front-side-environment recognition camera during the execution of the adaptive cruise control based on the distance from the vehicle to the leading vehicle obtained by the front-side-environment recognition sensor.

4. The driving assist apparatus according to claim 3, wherein the control device is configured to resume the adaptive cruise control based on a distance from the vehicle to the leading vehicle obtained by the image recognition of the front-side-environment recognition camera in a case where the leading vehicle is recognized by the image recognition of the front-side-environment recognition camera during the execution of the adaptive cruise control based on the distance from the vehicle to the leading vehicle obtained by the front-side-environment recognition sensor.

5. The driving assist apparatus according to claim 2, wherein the control device is configured to resume the adaptive cruise control based on a distance from the vehicle to the leading vehicle obtained by the image recognition of the front-side-environment recognition camera in a case where the leading vehicle is recognized by the image recognition of the front-side-environment recognition camera during the execution of the adaptive cruise control based on the distance from the vehicle to the leading vehicle obtained by the front-side-environment recognition sensor.

6. The driving assist apparatus according to claim 1, wherein the control device is configured to resume the adaptive cruise control based on a distance from the vehicle to the leading vehicle obtained by the image recognition of the front-side-environment recognition camera in a case where the leading vehicle is recognized by the image recognition of the front-side-environment recognition camera during the execution of the adaptive cruise control based on the distance from the vehicle to the leading vehicle obtained by the front-side-environment recognition sensor.

7. A driving assist apparatus for a vehicle, the driving assist apparatus comprising:
   a front-side-environment recognition camera configured to recognize a driving environment ahead of the vehicle;
   a front-side-environment recognition sensor configured to recognize the driving environment ahead of the vehicle; and
   a control device configured to:
      determine that image recognition of the front-side-environment recognition camera for a leading vehicle for adaptive cruise control has deteriorated during execution of the adaptive cruise control; and
      in response to determining that the image recognition of the front-side-environment recognition camera for a leading vehicle has deteriorated, execute brake pressure application by raising a brake fluid pressure to be applied to a braking device, and continue to execute the adaptive cruise control based on a distance from the vehicle to the leading vehicle obtained by the front-side-environment recognition sensor.

8. The driving assist apparatus according to claim 7, wherein the control device is configured to cancel the brake pressure application in a case where the leading vehicle is recognized by the image recognition of the front-side-environment recognition camera during the execution of the adaptive cruise control based on the distance from the vehicle to the leading vehicle obtained by the front-side-environment recognition sensor.

9. The driving assist apparatus according to claim 8, wherein the control device is configured to resume the adaptive cruise control based on a distance from the vehicle to the leading vehicle obtained by the image recognition of the front-side-environment recognition camera in a case where the leading vehicle is recognized by the image recognition of the front-side-environment recognition camera during the execution of the adaptive cruise control based on the distance from the vehicle to the leading vehicle obtained by the front-side-environment recognition sensor.

10. The driving assist apparatus according to claim 7, wherein the control device is configured to resume the adaptive cruise control based on a distance from the vehicle to the leading vehicle obtained by the image recognition of the front-side-environment recognition camera in a case where the leading vehicle is recognized by the image recognition of the front-side-environment recognition camera during the execution of the adaptive cruise control based on the distance from the vehicle to the leading vehicle obtained by the front-side-environment recognition sensor.

* * * * *